United States Patent
Revisky et al.

(10) Patent No.: US 7,133,503 B2
(45) Date of Patent: Nov. 7, 2006

(54) INCOMING CALL CONTROL BY THE CALLED PARTY

(75) Inventors: Tamara A. Revisky, Sheridan, IL (US); Robert M. Zieman, Naperville, IL (US); Charles L. Warren, West Chicago, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 290 days.

(21) Appl. No.: 10/609,847

(22) Filed: Jun. 30, 2003

(65) Prior Publication Data
US 2004/0264653 A1 Dec. 30, 2004

(51) Int. Cl.
*H04M 1/64* (2006.01)
(52) U.S. Cl. .............................. 379/88.12; 379/211.02; 455/412.1
(58) Field of Classification Search ............ 379/88.12, 379/88.22, 88.26, 93.23, 210.01, 211.02; 455/412.1, 567
See application file for complete search history.

(56) References Cited

U.S. PATENT DOCUMENTS

| | | | | |
|---|---|---|---|---|
| 5,790,638 | A | * | 8/1998 | Bertacchi .................. 379/88.26 |
| 6,028,922 | A | * | 2/2000 | Deutsch et al. ......... 379/211.02 |
| 6,246,889 | B1 | * | 6/2001 | Boltz et al. .................. 455/567 |
| 2003/0054865 | A1 | * | 3/2003 | Byers et al. ................. 455/567 |

* cited by examiner

*Primary Examiner*—Gerald Gauthier

(57) ABSTRACT

A telephony communication device is capable, upon an election by a user, of transmitting a defer answer signal in response to receiving notification of an incoming call. The defer answer signal causes the telephony infrastructure equipment to place the calling party on hold and play a voice message to the calling party requesting that the party remain on hold and preferably informing the calling party that the called party will be able to accept the call within a predetermined time. Upon the called party becoming available to accept the incoming call, the called party retrieves the waiting call by sending a connect call signal from subscriber's communication device.

11 Claims, 3 Drawing Sheets

INCOMING CALL CONTROL BY THE CALLED PARTY

BACKGROUND

This invention is generally directed to telecommunication systems, and is more specifically directed to providing the called party with additional options for handling an incoming call where it is not desired to answer the call immediately.

Telephone subscribers may receive an incoming telephone call at a time that is inconvenient to answer. For example, the subscriber may be engaged in an in-person conversation with another and does not desire to interrupt the current conversation to answer an incoming call. This situation is especially common for wireless subscribers that normally carry a cellular telephone. Assuming that the subscriber utilizes a voicemail service, the unanswered incoming call could be diverted to the subscriber's voicemail service giving the caller an opportunity to leave a message. However, this does not satisfy a need for an interactive conversation.

A common situation exists in which the called party does not wish to immediately answer an incoming call, but would be able to answer the incoming call within a short time, e.g. one or two minutes. Such a "deferred" answer may be preferable to both the calling and called parties. In many situations the ability to employ a defer answer may provide efficiencies. It eliminates the called party from having to retrieve a voicemail message and attempting to reach the other party by initiating a new call. From the calling party's perspective, it eliminates the uncertainty of when the called party will be available to retrieve a voicemail message and the uncertainty of possibly being unavailable to accept the return call.

Telecommunication systems offer wireless and wireline users the ability to subscribe to call waiting service. This service provides a subscriber engaged in a telephone conversation with another party with an alert indicating that the subscriber has another incoming call. The basic service provides an audible tone to the called party to indicate another incoming call is waiting. An advanced form of the call waiting service provides the called party with the telephone number and/or name of the call waiting party utilizing incoming call identification (CID). The called party after being alerted of the call waiting call can ignore the incoming call and continue the conversation with the other party, or can put the current party on hold and answer the incoming new call. Although the called party can return to the conversation with the other party after electing to answer the incoming new call, it is an interruption and often times an annoyance to both the other party and the called party. A defer answer capability would permit the called party to handle a call waiting caller without having to disrupt the conversation with the other party. Thus, there exists a need for a defer answer capability.

SUMMARY OF THE INVENTION

It is an object the present invention to provide a solution for this need.

In accordance with embodiment of the present invention, a telephony communication device is capable, upon an election by a user, of transmitting a defer answer signal in response to receiving notification of an incoming call. The defer answer signal causes the telephony infrastructure equipment to place the calling party on hold and play a voice message to the calling party requesting that the party remain on hold and preferably informing the calling party that the called party will be able to accept the call within a predetermined time. Upon the called party becoming available to accept the incoming call, the called party retrieves the waiting call by sending a connect call signal from subscriber's communication device.

Steps taken by the telecommunication system in handling the defer answer signal and processing the resulting related actions are also within the present invention.

DETAILED DESCRIPTION

Figure 1:
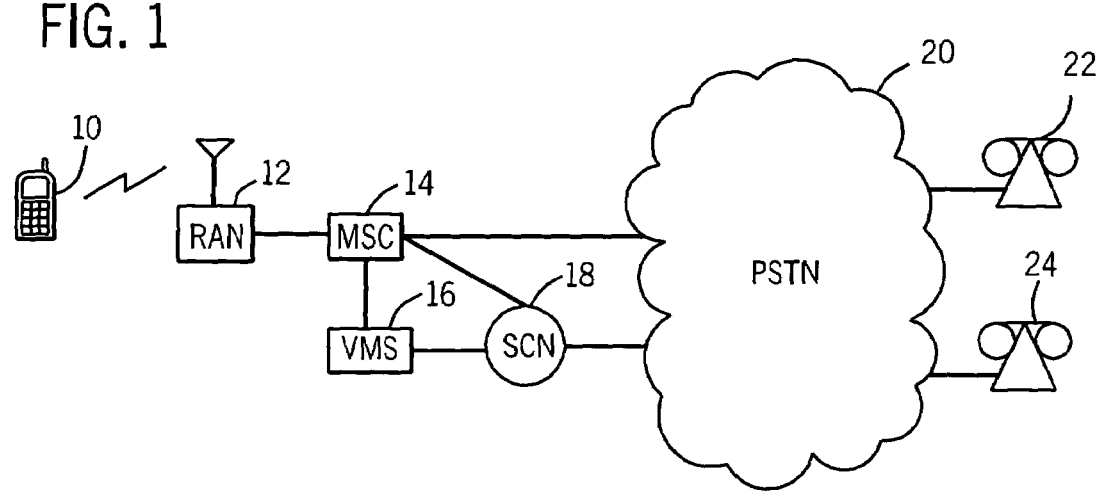
FIG. 1 is a diagram illustrating a telecommunications system suited for employing embodiments of the present invention.

FIG. 1 shows a telecommunications system that includes a wireless communication device 10, such as a cellular telephone, with wireless communications being supported by radio access node (RAN) 12. A mobile switching center (MSC) 14 supports RAN 12 and is connected to a voice messaging system (VMS) 16, service circuit node (SCN) 18, and the public switched telephone network (PSTN) 20. Wireline telephones 22 and 24 are supported by the PSTN 20. A consumer communication device as well as the user of the device will be referenced by the same reference numeral since it will be apparent from the context of whether the user or the device is intended.

Figure 2:
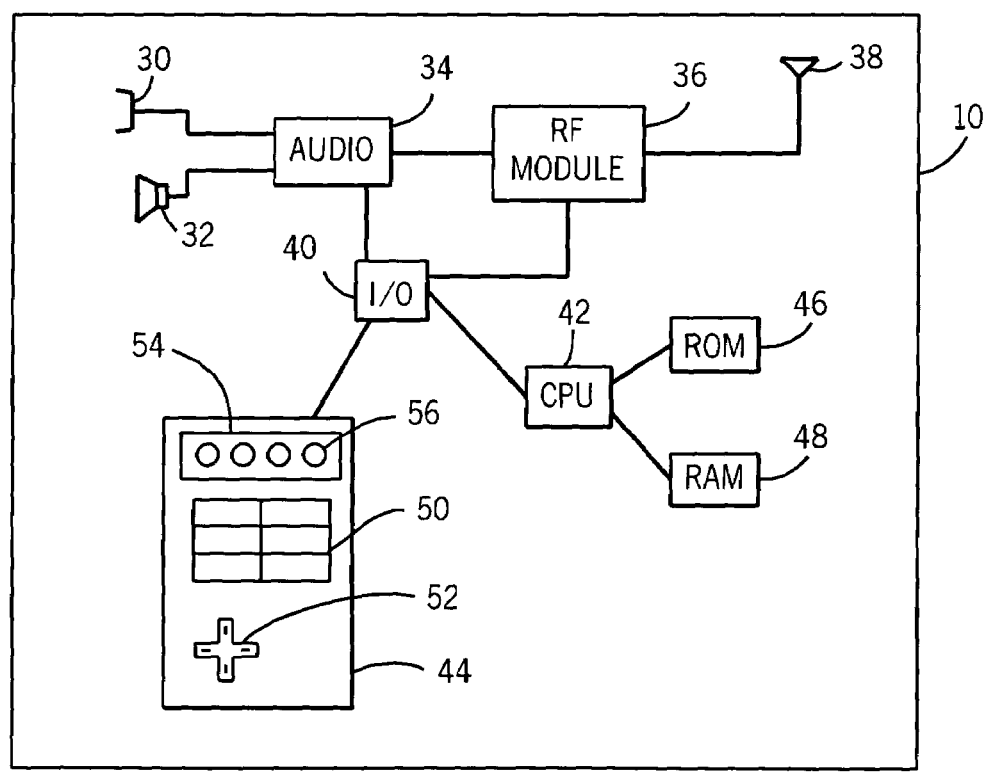
FIG. 2 is a diagram of a wireless communication device incorporating an embodiment of the present invention.

FIG. 2 illustrates an exemplary wireless communication device 10 that comprises a cellular telephone. A microphone 30 and a speaker 32 are connected to an audio module 34. A radio frequency (RF) module 36 is connected to audio module 34 and to antenna 38. The RF module 36 is responsible for transmitting and receiving wireless signals that carry audio to and from the audio module 34. The RF module 36 is also responsible for receiving and transmitting control signals and messages between the wireless telephone and RAN 12. An input/output (I/O) module 40 provides an interface for signals sent to and transmitted from central processing unit (CPU) 42 and audio module 34, RF module 36 and keypad 44. As used herein the keypad refers to all mechanical buttons and devices associated with communication device 10 operable by the user to initiate events or functions. The CPU 42 is supported by read-only memory (ROM) 46 and random access memory (RAM) 48. The ROM 46 contains stored program control instructions that controls the operation of the wireless device 10 in conjunction with instructions and data stored in RAM 48.

The exemplary keypad 44 includes conventional touch-tone dialing buttons 50, a four-way cursor control button 52 and special purpose buttons 54. The cursor control button may be used for various functions including controlling and selecting items shown on the display screen. The special purpose buttons each typically initiate an associated function(s) when activated by the user. The function associated with a special purpose button may be different depending upon the operational status of the wireless communication device. Common special purpose buttons include ON/OFF, Send, End, etc. In accordance with an embodiment of the present invention, a special purpose button 56 is provided that, when activated by the user, generates a defer answer (DA) signal resulting in a voice message being transmitted to a calling party advising of the option of remaining on hold for a short time before the called party can answer.

Figure 3:
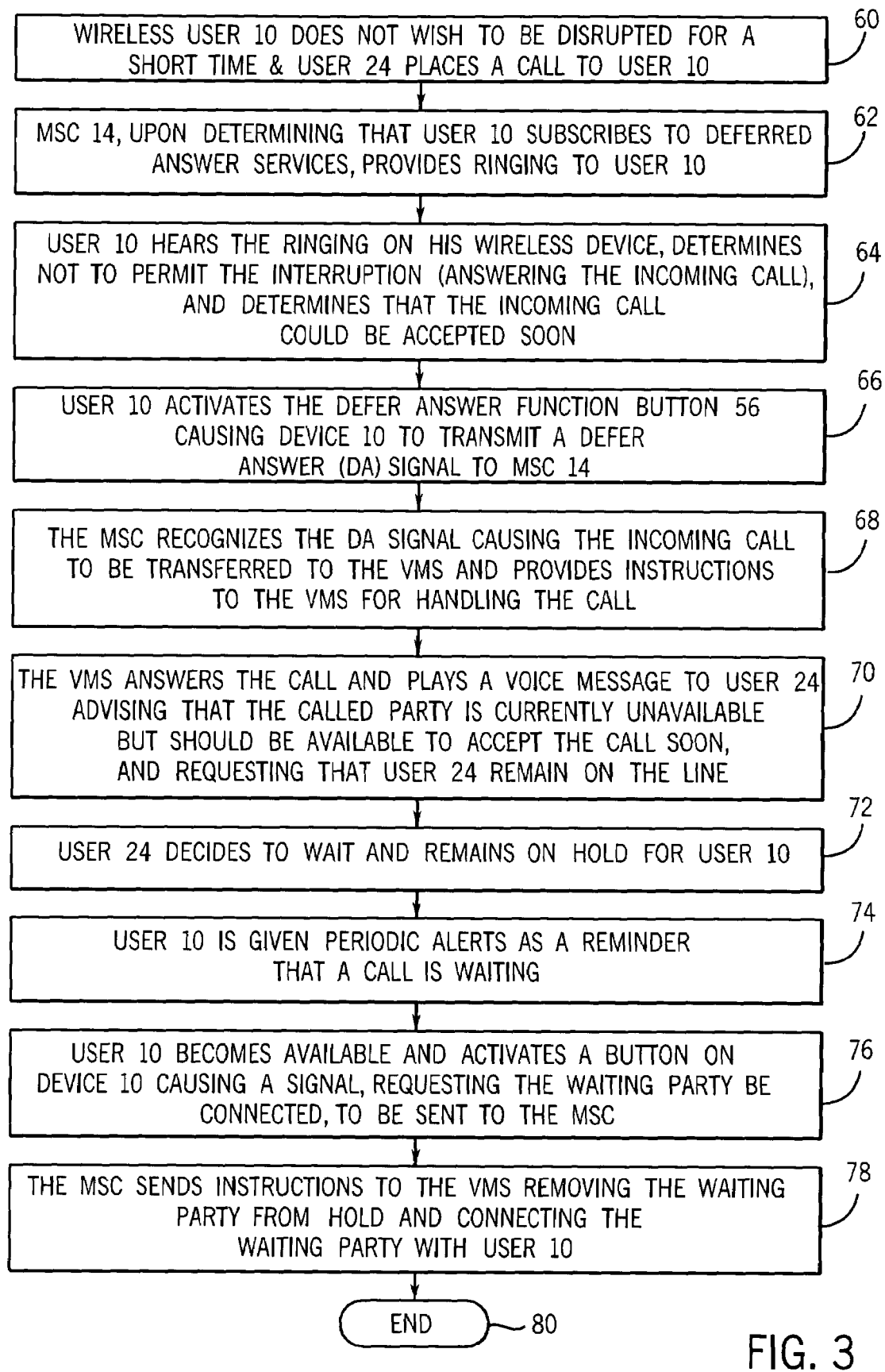
FIG. 3 is flow diagram showing an exemplary method according to the present invention.

FIG. 3 is an exemplary flow diagram illustrating an embodiment of the present invention in which user 10, without disrupting a current in-person conversation with another, is able to send a communication to a calling party. In step 60 wireless user 10 is in an in-person conversation with another, and user 24 places a call to user 10. In step 62 MSC 14, upon determining that user 10 subscribes to defer answer services, places a call to user 10. The communication device of user 10 rings and user 10 determines not to accept an interruption (the incoming call), but that the incoming call can be accepted soon in step 64. In step 66, user 10 activates the defer answer function button 56 causing device 10 to transmit a DA signal to MSC 14 while the in-person conversation continues. In step 68 the MSC recognizes the DA signal causing the incoming call to be transferred to the VMS and provides instructions to the VMS for handling the call. The instructions direct the VMS to answer the call and play the recorded custom voice message of the called party to user 24 in step 70. The voice message advises that the called party is currently unavailable but should be available to accept the call soon, and requests that the calling party remain on the line. User 24 upon hearing the voice message decides to wait and remains on hold for user 10 in step 72. In step 74 user 10 is given periodic alerts as a reminder that the call is waiting. In step 76 user 10 concludes the call with the in-person conversation and activates a button on device 10 causing the generation of a connect call signal sent to the MSC requesting the waiting call to be connected. In step 78 the MSC sends instructions to the VMS removing the call from hold and connects the call waiting party with user 10. The process terminates at END 80.

Figure 4:
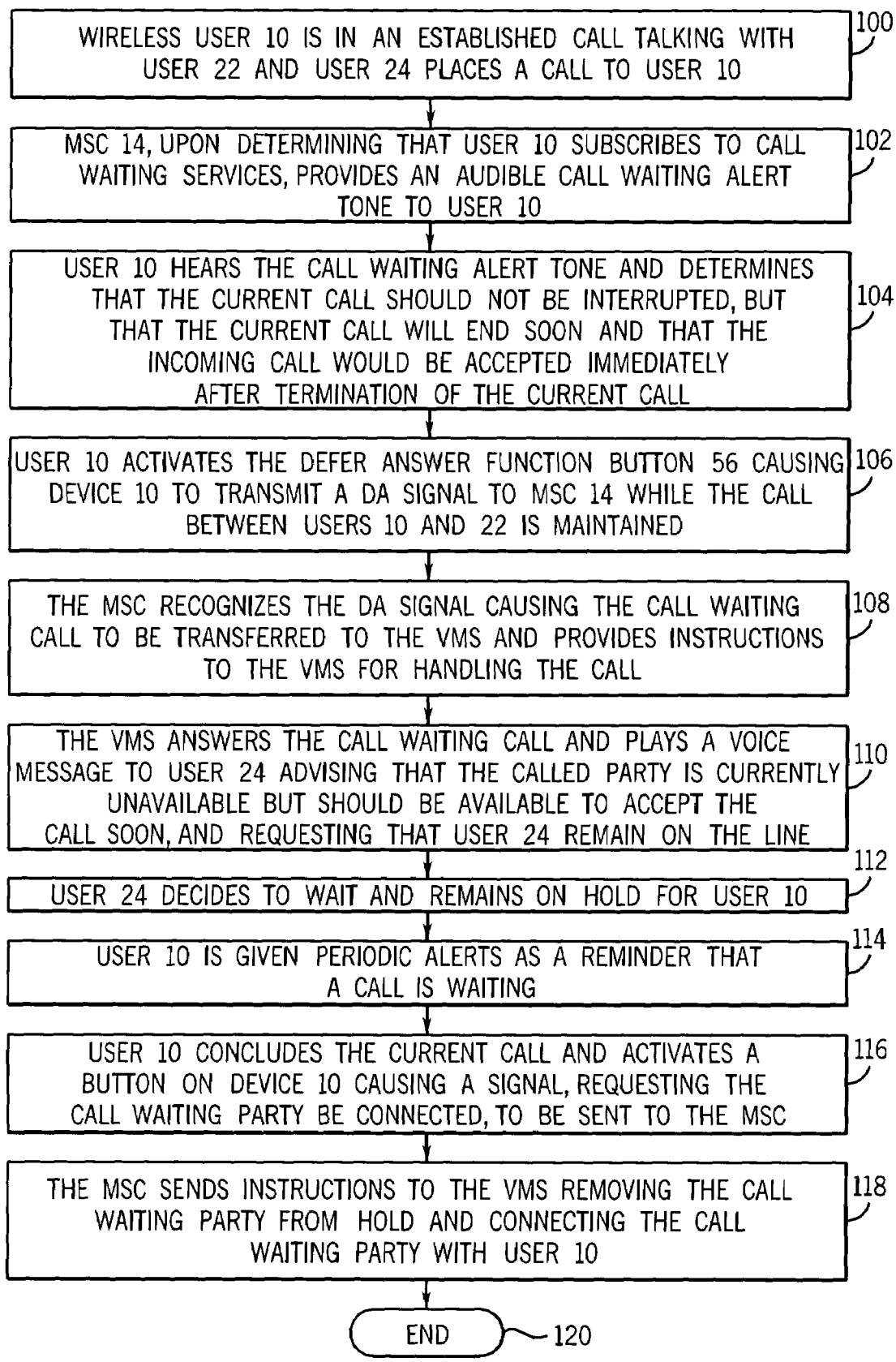
FIG. 4 is flow diagram showing an exemplary method according to the present invention when a new incoming call is presented as a call waiting alert.

FIG. 4 is an exemplary flow diagram illustrating an embodiment in which user 10, without leaving a current telephone conversation with user 22, is able to send a communication to a call waiting party. In step 100 wireless user 10 is in an established call talking with user 22, and user 24 places a call to user 10. In step 102 MSC 14, upon determining that user 10 subscribes to call waiting services, provides an audible call waiting tone to user 10. User 10 hears the call waiting alert tone and determines that the current call should not be interrupted, but that the current call will end soon and that the incoming call will be accepted immediately after termination of the current call in step 104. In step 106, user 10 activates the defer answer button 56 causing device 10 to transmit a DA signal to MSC 14 while the call between users 10 and 22 is maintained. In step 108 the MSC recognizes the DA signal causing the call waiting call to be transferred to the VMS and provides instructions to the VMS for handling the call. The instructions direct the VMS to answer the call waiting call and play the recorded custom voice message of the called party to user 24 in step 110. The voice message advises that the called party is currently unavailable but should be available to accept the call soon, and requests that the calling party remain on the line. User 24 upon hearing the voice message decides to wait and remains on hold for user 10 in step 112. In step 114 user 10 is given periodic alerts as a reminder that the call is waiting. In step 116 user 10 concludes the call with the other subscriber (the current call) and activates a button on device 10 causing the generation of a connect call signal sent to the MSC requesting the call waiting party be connected. The connect call signal can be automatically activated upon the called party activating a button on the called party's telephony device terminating the telephone call with the another party. In step 118 the MSC sends instructions to the VMS removing the call waiting party from hold and connects the call waiting party with user 10. The process terminates at END 120.

Additional details and alternatives exist with regard to the steps described with regard to FIGS. 3 and 4. The defer answer button 56 can be a special purpose button devoted solely to this task or could be a multipurpose function button that initiates the DA signal when activated while certain conditions exist as determined by the CPU 42. The certain conditions could be a combination of the user currently engaged in an active call and receipt of call waiting tones, or receipt of a new call as indicated by ringing. The DA signal may comprise an in-band or out-of-band signal transmitted from device 10 to the MSC. An out-of-band signal would be advantageous in that it would minimize, if not eliminate, an audio disruption to users 10 and 22 in the case of an existing call. The voice message played to the call waiting party could, if desired by the called party and previously arranged with the called party's service provider, provide a specific time instead of "soon". For example, the voice message could advise the calling party that the called party is unavailable but should be available to accept the call within one minute. Also the voice message could be a custom message recorded in the voice of the called party. With regard to steps 84 and 114, the periodic alerts may consist of a "waiting call parked" tone provided to user 10 that is preferably generated locally in device 10 under the control of CPU 42 but could also be accomplished by periodic signals and/or audio tones being generated by SCN 18 and transferred to the user by MSC 14. Preferably the waiting call parked tone is different from an initial call waiting tone to enable the called party to distinguish the conditions associated with each tone. In steps 86 and 116 the button activated on device 10 causing the waiting call to be connected could be an activation of any button on the keypad except the END button, or could be associated with a specific button such as another activation of defer answer button 56.

Further changes and modifications can be made to the described embodiment while remaining within the scope of the present invention. By way of example, and not intended as an exhaustive listing of all possible changes, exemplary alternatives are described. Visual indicia instead of audible tones could be provided by communication device 10 as alerts for the called party. The defer answer signal could be triggered by a spoken command as interpreted by speech recognition software. A plurality of special purpose buttons each associated with a defer answer signal could be utilized to provide the called party user with a choice of corresponding recorded messages to be played to the call waiting party. For example, a first DA button could trigger a voice message requesting the waiting call to hold and advising that the called party will be available within 30 seconds. A second DA button could trigger voice message requesting the waiting call to hold and advising that the called party will be available within two minutes. A third DA button could trigger a voice message advising the waiting call that the called party will not likely be available to accept the call within five minutes and explaining that the call waiting party can elect to hold and at any time elect to cease holding and leave a voicemail message by entering "*1". With the selection of the third button, the VMS will monitor the call waiting party line for the "*1" signal indicating a transfer to the called party's voicemail. The SCN, VMS, or combination of these two in conjunction with the MSC can be utilized to implement the steps in the telecommunication infrastructure equipment. Although the illustrative embodiment is explained for a wireless subscriber as the called party, the button associated with the defer answer signal could also be implemented on a wireline telephone. The present invention is especially, but not exclusively, suited for implementation on telephones in which out-of-band signaling is available such as an ISDN telephone or an IP telephone.

Although embodiments of the invention have been described above and shown in the figures, the scope of the invention is defined by the claims that follow.

We claim:

1. A method implemented in a telecommunications system for providing a called party with selectable control for handling an incoming call from a calling party, the method comprising the steps of:
   receiving on a called party's wireless telephony device an alert of an incoming call;
   transmitting a defer answer wireless signal from the called party's wireless telephony device to an infrastructure switch handling the telephone call in response to activation of a corresponding special purpose button;
   in response to receipt of the defer answer signal by the switch, the switch putting the incoming call on hold and playing a recorded voice message customized by the called party to the calling party;
   transmitting a connect call wireless signal from the called party's telephony device to the switch in response to an activation initiated by the called party;
   in response to receipt of the connect call wireless signal, the switch connecting the incoming call to the called party
   wherein said wireless telephony device includes said special purpose button and wherein said defer answer signal is transmitted as an out-of-band signal to the switch.

2. The method according to claim 1 wherein the playing of the recorded voice message comprises playing a voice message customized by the called party to advise the calling party of a specified time within which the called party anticipates accepting the call.

3. The method according to claim 1 further comprising the step of transferring the incoming call from the switch to a voice messaging system.

4. The method according to claim 3 further comprising transmitting instructions from the switch to the voice messaging system to control the voice messaging system to put the incoming call on hold and to instruct the voice messaging system to play the voice message customized by the called party.

5. A method implemented by infrastructure equipment in a telecommunications system for implementing a defer answer option selectable by a called party upon receiving an incoming call, the method comprising the steps of:
   receiving a defer answer signal from the called party's telephony device where the defer answer signal is selectively activated for transmission by the called party and is an out-of-band defer answer signal;
   in response to receipt of the defer answer signal, putting the calling party on hold and playing a recorded voice message customized by the called party to the call waiting party;
   receiving a connect call signal transmitted from the called party's telephony device;
   in response to receipt of the connect call signal, connecting the calling party to the called party.

6. The method according to claim 5 wherein the playing of the recorded voice message comprises playing a voice message customized by the called party to advise the calling party of a specified time within which the called party anticipates accepting the call from the calling party.

7. The method according to claim 5 further comprising the step of transferring the call from the calling party from a switch handling the telephone call between the called party and the another party to a voice messaging system.

8. The method according to claim 7 further comprising the step of transmitting instructions from the switch to the voice messaging system to cause the voice messaging system to select the voice message customized by the called party for playing to the calling party.

9. A method implemented in a telecommunications system for providing a called party with selectable control for handling an incoming call from a calling party, the method comprising the steps of:
   receiving on a called party's wireless telephony device an alert of an incoming call;
   transmitting a defer answer wireless signal from the called party's wireless telephony device to an infrastructure switch handling the telephone call in response to activation of a corresponding special purpose button;
   in response to receipt of the defer answer signal by the switch, the switch putting the incoming call on hold and playing a recorded voice message customized by the called party to the calling party;
   transmitting a connect call wireless signal from the called party's telephony device to the switch in response to a activation initiated by the called party;
   in response to receipt of the connect call wireless signal, the switch connecting the incoming call to the called party;
   wherein, prior to the receiving step, the called party was engaged in a telephone call with another party, the receiving step comprising providing a call waiting alert on the called party's telephony device;
   wherein the step of transmitting a connect call signal is automatically activated upon the called party activating a button on the called party's telephony device terminating the telephone call with the another party.

10. A method implemented by infrastructure equipment in a telecommunications system for implementing a defer answer option selectable by a called party upon receiving an incoming call, the method comprising the steps of:
    receiving a defer answer signal from the called party's telephony device where the defer answer signal is selectively activated for transmission by the called party;
    in response to receipt of the defer answer signal, putting the calling party on hold and playing a recorded voice message customized by the called party to the call waiting party;
    receiving a connect call signal transmitted from the called party's telephony device;
    in response to receipt of the connect call signal, connecting the calling party to the called party;
    wherein the step of determining that the called party subscribes to defer answer services prior to the step of putting the called party on hold and playing the recorded voice message.

11. The method according to claim 5 wherein the putting and playing steps comprise transferring the incoming call to a voice messaging system from a telecommunications switch.

* * * * *